(No Model.) 2 Sheets—Sheet 1.
C. A. BASS.
AIR BRAKE FOR LOCOMOTIVES AND RAILWAY CARS.
No. 312,245. Patented Feb. 17, 1885.
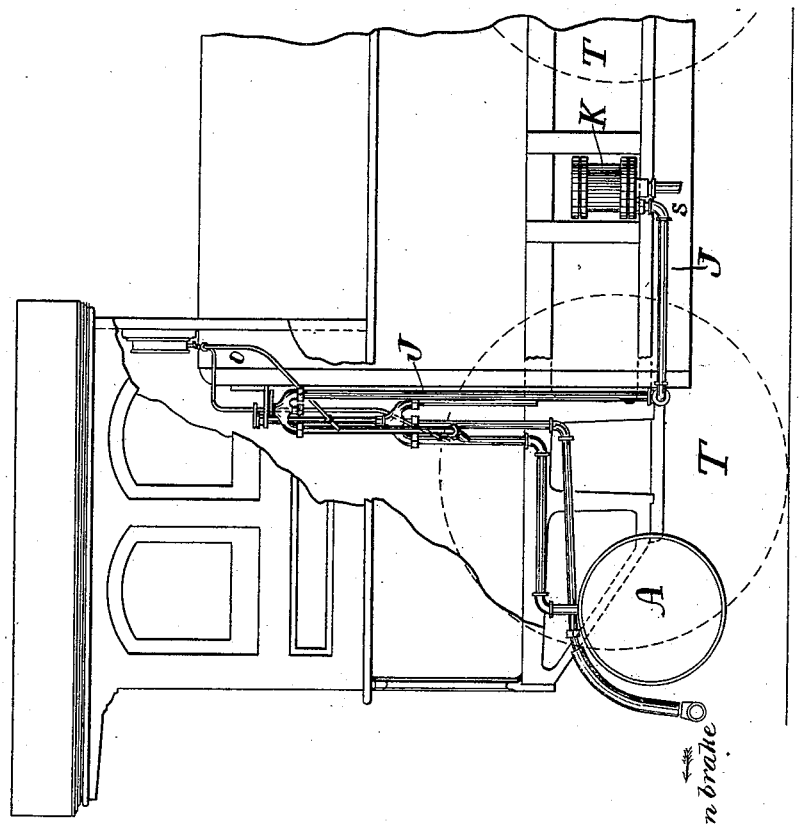
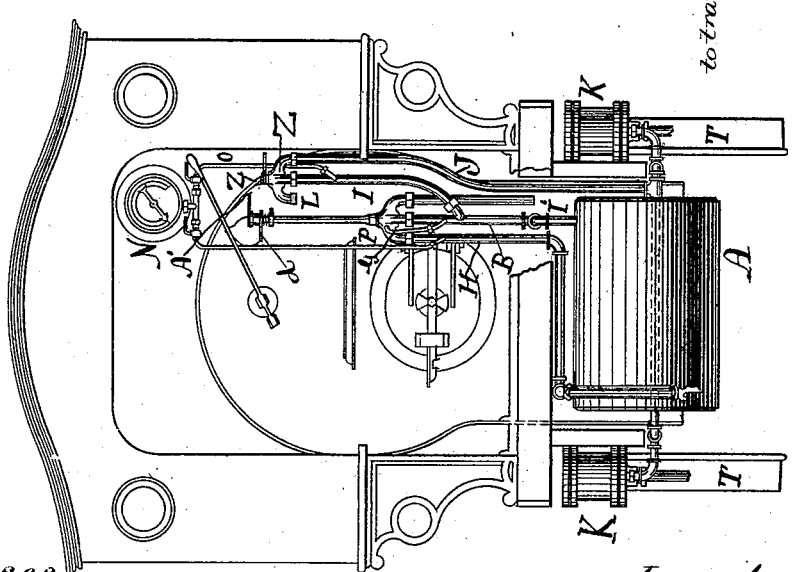
Witnesses
E J McElroy
J P McElroy
Inventor
C A Bass
By Jas A Cowles
Attorney (No Model.) 2 Sheets—Sheet 2.
C. A. BASS.
AIR BRAKE FOR LOCOMOTIVES AND RAILWAY CARS.
No. 312,245. Patented Feb. 17, 1885.
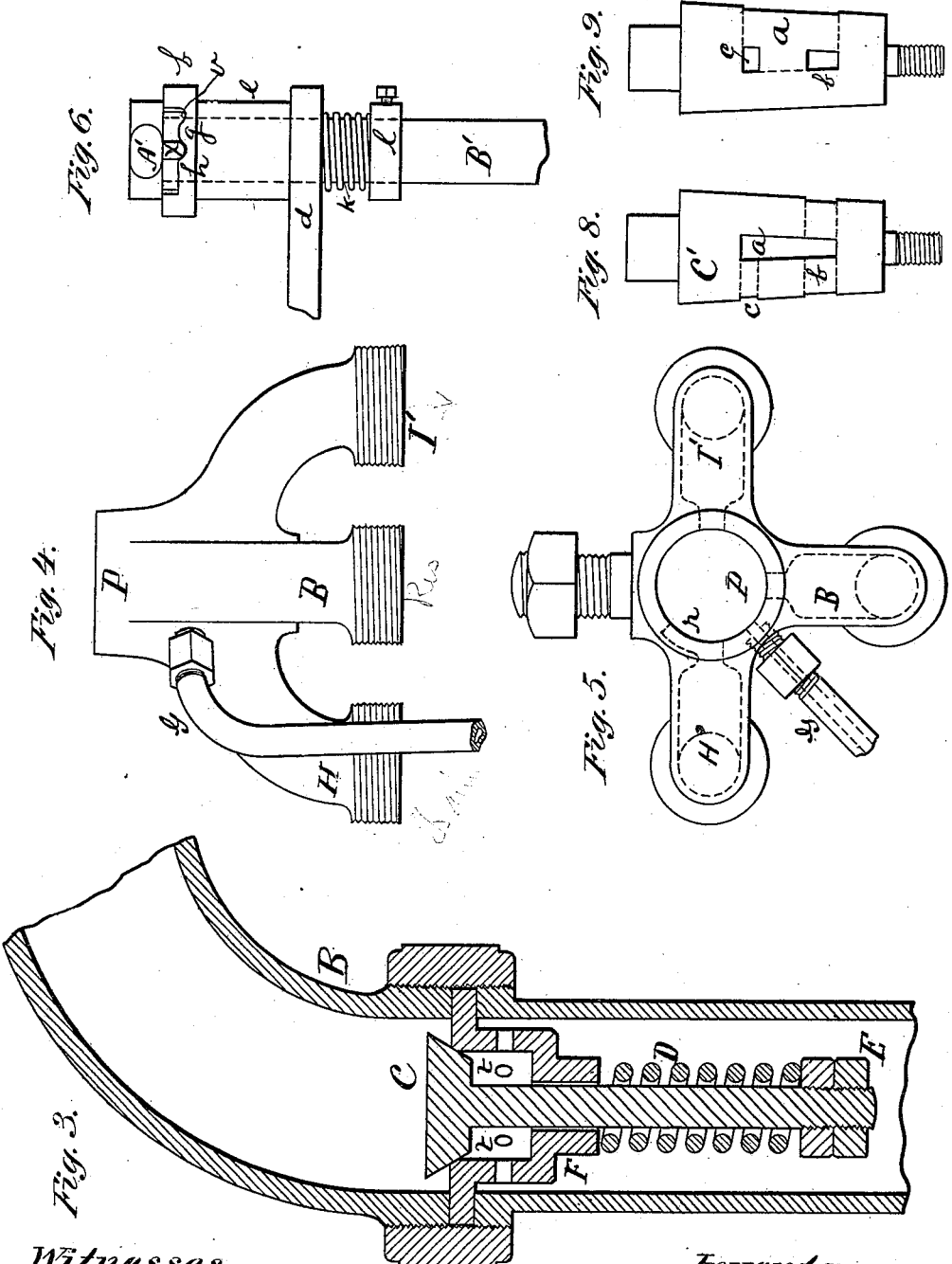

UNITED STATES PATENT OFFICE.

CHARLES A. BASS, OF CICERO, ILLINOIS.

AIR-BRAKE FOR LOCOMOTIVES AND RAILWAY-CARS.

SPECIFICATION forming part of Letters Patent No. 312,245, dated February 17, 1885.

Application filed January 11, 1884. (No model.)

*To all whom it may concern:*

Be it known that I, CHARLES A. BASS, a citizen of the United States, residing in the town of Cicero, in the county of Cook and State of Illinois, have invented a new and useful Improvement in Air-Brakes for Locomotives and Railway-Cars, of which the following is the specification.

Figure 1 is a front view of the locomotive, looking forward from the cab, showing my improvement. Fig. 2 is a side view of rear end of locomotive and cab, with a portion of cab cut away to show my improvement. Fig. 3 is a detail vertical sectional view of pipe leading from air-drum to the three-way cock, with valve therein. Fig. 4 is a detail of three-way cock, with pipe for using reserve power of air. Fig. 5 is a cross-section of three-way cock. Fig. 6 is a detail of upper part of rod for working plug in three-way cock. Figs. 8 and 9 are details of plug in three-way cock.

The object of this invention is to provide the locomotive with a device for working the brakes of the driving-wheels independent of the train-brakes in addition to the device for working the train-brake, both being under the control of the engineer, a means for using the reserve power of the compressed air in the reservoir, and for regulating the movement of the plug in the three-way cock.

Similar letters of reference refer to similar parts in the different drawings.

I can apply my improvement to any locomotive.

From the pipe B, leading from the reservoir A to the three-way cock P of the train-brake, I lead the pipe I up to a second three-way cock, Z, and from this three-way cock leads the pipe J to the air-cylinder K, attached to the locomotive between the drive-wheels T T. The brakes are not shown, as I do not lay any claim to any particular style or system of brakes for this purpose. This air-cylinder, through the piston S, works the brakes on the drive-wheels.

O is the gage-pipe leading from the pipe I to the pipe H and up to the air-gage N.

L is the exhaust-pipe of the cock Z, and I' is the exhaust-pipe of the three-way cock P.

A', Fig. 6, is the lever-working rod B'. The lower end of this rod is made with a socket end, which fits upon the plug C'. The socket end of this rod is not shown. The plug C' works in the three-way cock P. In this plug is the long port $a$, extending a little beyond the center of the plug, a side view of which is shown in Fig. 9.

Transversely to and at the lower part of the port $a$ is the port $b$, extending entirely through the plug, a side view of which is shown in Fig. 8.

At the upper end of port $a$ is the port $c$, extending to the port $a$.

In the shell of the cock at $r$, Fig. 5, is a side extension leading to train-pipe H.

In Fig. 6, $d$ is a bracket extending from the boiler, and the sleeve $e$ is attached to this bracket $d$. The object of this sleeve is to give a bearing or a steady support to rod B'. I do not confine myself to any particular length of this sleeve. By making bracket $d$ thicker the same effect could be accomplished. The rod B' passes through this sleeve $e$ or the bracket, and upon the upper end of sleeve $e$ is the ledge $f$. The upper edge of this ledge $f$ is cut away, forming the scalloped surface $g$ and the level surface $h$.

$x'$ is a projection on under side of handle A', and works on scalloped and plane surface $g$.

$k$ is a coiled spring around B', resting on its seat $l$, fastened to rod B, and at its upper end working against bracket $d$.

In the pipe B, leading from the reservoir A, a little below the three-way cock P and above pipe I, I place a valve, C, Fig. 3, in a suitable valve-seat and weighted by the coiled spring D on the stem of the valve, working between the rest E at lower end of valve-stem and valve-seat F. The air passes through holes $t\,t$ to the under side of valve C. As the air lifts the valve C the spring D is compressed, and it can be set to resist to any given amount of pressure, and this resistance of the spring is the reserve power in the reservoir. To utilize this reserve power, I use the pipe G, with the upper end entering the three-way cock P between the pipe B, leading from the reservoir, and pipe H, leading from the three-way cock to the train-brake, and the lower end entering the pipe B below the valve C. (See Fig. 1.) Thus the reserve power below the valve C is conveyed around it and discharged through plug C' into train-pipe H. The plug C' is placed in the three-way cock P, and according as it is turned the ports therein register with the various pipes leading from the cock. The pipe G enters the three-way cock P, so it will only register with port $c$ in the plug. When the port $a$ in the plug registers with pipe H and port $b$ registers with pipe B, then the brakes of the train are released and the handle A' is located as shown in Fig. 6. By moving the handle A' to the left the port $b$ will register with pipes H and I, the air will be exhausted through I from train-pipe H, and the brakes will be set. When the handle A' is returned to the right-hand scallop $v$, then port $a$ registers with pipe G, and port $c$ registers with extension $r$, Fig. 5, and the reserve power is brought into use by the air passing from below the valve C, through pipe G, through ports $a$ and $c$, into train-pipe H. Air is constantly being pumped into reservoir A.

It will be observed that I distribute the air from the reservoir A through two three-way cocks, and thus work two systems of brakes, each independent of the other and both under the control of the engineer, one being the train-brake and the other the driver-brake, and also when the two systems of brakes are applied there is a difference of the power used in each system on the brakes.

The power applied to the driver-brakes exceeds that applied to the train-brake by the amount of the reserve power created by the spring D. This reserve power below the valve C is used under the following circumstances:

When the train-brakes are set with any given quantity of power—say, sixty pounds—then it will take the same quantity of power—say, sixty pounds—to release them. There may not be this sixty pounds of power above the valve C to use because the joints in the train-pipe may leak; but instantly the sixty pounds are required above the valve C, and it is supplied from the reservoir below the valve C through pipe G. If valve C were not in pipe B, then would the pressure be equal on driver-brakes and train-brakes, and when it was desired to release the train-brake there would not be pressure enough, as part has been used to set driver-brake, and the joints in train-brake may have leaked also. By use of valve C a reserve power is created, which, passing through pipe G, supplies the deficiency. The surface of the ledge $f$ at top of sleeve $e$, together with the lug $x$, working on said surface, give positive knowledge to the engineer how far to turn the plug to secure the desired result.

I claim—

1. A railway-brake system comprising two separate sets of pressure-brakes, one applied to the wheels of the train, the other to wheels on the engine, each set being controlled by a valve independent of the other, and means, substantially as described, for applying a reserve power to the brake on the engine.

2. In combination with a three-way train-cock, the pipe B, leading from the reservoir to the three-way train-cock provided with a weighted valve, C, the pipe G, leading from the pipe B below the weighted valve C to the three-way train-cock, said cock being provided with the side-extending port $r$ and plug C', said plug being provided with the long port $a$ and port $c$, whereby the reserve power created by the weighted valve passes into the train-pipe when the side-extending port $r$, port $c$, long port $a$, and pipe G register and the end of pipe B is closed, as and for the purpose shown.

3. In combination with a three-way cock on an air-brake, the rod B', sleeve $e$, with a portion of the upper edge cut away and forming a corrugated surface, spring $k$, bracket $d$, and rest $l$, as and for the purpose shown.

4. The combination of the pipes B and I, three-way cock Z, and pipe J, for conducting the air from reservoir to cylinder, which works drive-wheel brakes independent of train-brakes, as and for the purpose shown.

CHARLES A. BASS.

Witnesses:
JAS. A. COWLES,
JOHN F. GOLDING.